United States Patent Office 3,086,000
Patented Apr. 16, 1963

3,086,000
POLYMERIZATIONS OF DIOLEFINS
Bernard Wargotz, Cuyahoga Falls, Ohio, assignor to The Goodyear Tire & Rubber Company, Akron, Ohio, a corporation of Ohio
No Drawing. Filed Nov. 19, 1958, Ser. No. 774,845
10 Claims. (Cl. 260—94.3)

This invention relates to synthetic polymers. More particularly it relates to polymers of isoprene, butadiene and other conjugated diolefins polymerized in the presence of organo-metallic catalyst systems. Most particularly it relates to methods of increasing the molecular weight of these organo-metallic catalyzed polymers of conjugated diolefins.

It is known that conjugated diolefins undergo polymerization in the presence of complex metal catalysts such as complex metal alkyls, halides and hydrides. It has been disclosed that certain organo-metallic compounds will polymerize isoprene and butadiene to a form of stereospecific spatial orientation such as a cis 1,4 or a trans 1,4 structure. For instance, certain mixtures and amounts of aluminum alkyls and titanium tetrahalides when employed as catalysts will cause isoprene and butadiene to form trans 1,4 and cis 1,4 polyisoprenes and trans 1,4 and cis 1,4 polybutadienes.

Briefly, the preparation of these stereospecific polymers by means of these organo-metallic catalysts is accomplished as follows: the monomeric conjugated diolefins are usually dissolved in an inert solvent or diluent such as heptane, hexane or benzene. The solvent monomer volume ratio usually ranges from about 3:1 to about 10:1. Care is used to exclude all traces of oxygen and moisture. The organo-metallic compounds used as the catalyst are usually prepared as solutions or suspensions in the same or similar solvents in which the monomers are dipersed. The required amounts of catalyst are injected into the reaction vessel either separately or as a suspension of the mixture of catalysts. When the desired conversion of the monomer to polymer has been attained the reaction is stopped either by precipitating the polymer in an alcohol-water mixture such as isopropanol or ethyl alcohol in water or a rubber antioxidant is added and the solvent or diluent removed by evaporation. In either case the catalyst activity is destroyed either by the reaction with alcohol or the antioxidant.

It has been postulated that these organo-metallic catalyst systems cause the stereospecific orientation of the diolefins by the following mechanism. The true catalyst is a solid material containing complex positive ions. It acts to orient the monomer molecule and this oriented monomer molecule inserts itself between the catalyst and the growing polymer chain in the same orientation as the previous monomer units, thereby forming stereospecific spatially ordered polymer. Thus, at any given time before the catalyst activity is destroyed or the catalyst is deactivated there are present in the polymerization mixture, polymer molecules resulting from the polymerization of diolefins which have attached to one end of the molecule a metal complex which is or was the catalyst.

It has been found that the polymers of conjugated diolefins which are prepared from organo-metallic catalysts in the general manner described above possess certain similarities to natural products in their physical properties, composition and in structure. For instance, in structure and composition cis 1,4 polyisoprene is identical to the structure and composition of natural Hevea rubber. While the structure of cis 1,4 polybutadiene is identical to the structure of natural Hevea rubber, the composition of the structural units, being butadiene molecules, are homologs of the structural units of natural rubber (isoprene molecules). Trans 1,4 polyisoprene is identical to natural balata in both composition and structure and trans 1,4 polybutadiene is identical to natural balata in structure. The composition of each structural unit of trans 1,4 polybutadiene is a homolog of the structural units found in natural balata (also isoprene). Thus, due to the similarities of these stereospecific polydienes to natural products great interest has been developed in them as synthetic replacements for natural polymers. However, on occasion both cis 1,4 and trans 1,4 polymer structures of these diolefins, when prepared by using organo-metallic catalyst systems, do not attain a molecular weight as high as that of the natural products it most nearly resembles. For this reason the physical properties of these synthetic polymers are not quite as good as those of the natural products.

It is, therefore, the object of this invention to provide a method to increase the molecular weight of such polymers. A further object is to provide a method whereby polymers of organo-metallic catalyzed dienes, such as isoprene and butadiene may nearly approach the molecular weight of natural rubber and natural balata. A still further object is to provide a method whereby polymers having stereospecific spatial orientation exhibit improved physical properties. Other objects will appear as the description proceeds.

The objects of this invention are accomplished by adding to the polymerization mixture of organo-metallic catalyzed diolefins small amounts of a compound selected from the group consisting of aryl azo compounds of the formula R—N=N—R' and aryl hydrazo compounds of the formula

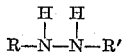

wherein R and R' are selected from the group of radicals consisting of phenyl, the halogen substituted phenyls, the lower alkyl substituted phenyls, the lower alkoxy substituted phenyls, the aryl substituted phenyls, the aryloxy substituted phenyls, naphthyl, the halogen substituted naphthyls, the lower alkyl substituted naphthyls, the lower alkoxy substituted naphthyls, the aryl substituted naphthyls and the aryloxy substituted naphthyls, allowing the molecular weight of the polymers to increase and isolating the polymers from the reaction mixture.

The usual or general procedure employed to form the stereospecific spatially oriented polymers from diolefins to which this invention relates is as follows: The monomers which are highly purified are dissolved in an inert solvent or diluent. These monomers may also be polymerized by bulk polymerization techniques. The solvent/monomer volume ratio may vary from 0/1 (bulk polymerization) up to as much as 20/1. However, it is preferred to use a volume ratio of from about 3/1 to 8/1. Specific examples of inert solvents or diluents useful in the formation of these polymers are aliphatic hydrocarbons such as pentane, hexane, and heptane and aromatic hydrocarbons such as benzene and toluene. The temperatures at which these polymers are formed are not critical and may vary from a very low temperature such as −100° C. up to 100° C. However, it is conventional to employ temperatures ranging from about 10° C. to 50° C. The order of addition of the constituents to the reaction vessel is not critical and may be accomplished in any order. A convenient method of addition is to add the diluent first, dissolve the monomer in the diluent, followed by the catalyst which is usually employed in a solution or suspension in the same or another inert diluent that was used to dissolve the monomers. Care must be exercised to employ air-, oxygen-and water-free technique, as water and oxygen tend to destroy the activity of the organo-metallic catalyst. These techniques being well known in the art will not be discussed here in great detail. When the desired conversion has been reached the polymers are usually isolated and processed to dry solid elastomeric polymers by one of either of the following techniques: One, the polymerization mixture consisting of diluent, polymer, residual monomer, and residual catalyst, is added to a water-alcohol solution such as a mixture of isopropanol and water. This coagulates the polymer and deactivates the residual catalyst. Some antioxidant is employed to protect the polymer while it is being air dried at temperatures ranging from room temperatures up to 180° F. or more. The other method of isolating the polymer is to add to the polymerization mixture an antioxidant which protects the polymer from degradation and deactivates the catalyst and evaporate off the remaining diluent by well known techniques leaving the solid polymer which is dried in air at temperatures ranging from room temperature to 180° F. or more. In either of these two techniques, the residual catalyst is deactivated by the action of water and alcohol or by the action of the antioxidant employed to protect the polymer. The procedures for preparing the polymers are well known to the art and are not discussed here in great detail.

Particular organo-metallic catalyst systems which are employed to prepare the polymers to which this invention relates usually consist of a mixture of halides of transition metals such as titanium, and vanadium with a metal alkyl of aluminum, beryllium, lithium and cadmium. However, other organo-metallic catalyst are also known to the art. Representative examples of the transition metal halides are titanium tetrachloride, titanium tetrabromide, titanium tetraiodide, vanadium trichloride, vanadium tribromide, vanadium triiodide. Representative examples of metal alkyls are aluminum trimethyl, aluminum triethyl, aluminum triisobutyl, aluminum tributyl, aluminum trihexyl, beryllium dimethyl, beryllium diethyl, beryllium diisobutyl, beryllium dibutyl, lithium butyl, lithium ethyl, cadmium dimethyl, cadmium diethyl, cadmium diisobutyl, cadmium dibutyl and the like. It is known, for example, that a mixture of titanium tetrachloride and aluminum triisobutyl or a mixture of cadmium diethyl and titanium tetrachloride when used as a catalyst will cause the formation of cis 1,4 polyisoprene and a mixture of aluminum triisobutyl and titanium tetraiodide will form cis 1,4 polybutadiene. A mixture of aluminum triisobutyl and vanadium trichloride is known to form trans 1,4 polyisoprene and trans 1,4 polybutadiene depending upon the mol ratio of the aluminum to vanadium.

The amount of total catalyst employed to form the polymers to which this invention relates may vary from a small catalytic amount such as 0.1 to a large excess such as 20 parts by weight per 100 parts by weight of monomers employed, however, it is conventional to use from about 0.5 to about 2.5 parts by weight of total catalyst per 100 parts of monomers by weight. The term total catalyst is meant to include the weight of both the metal halide and the metal alkyl combined to form the total.

The mol ratio of the metal of the metal alkyl to the metal of the metal halide of these catalyst systems is known to have an effect upon the yield and type of polymer structure produced. For instance, using a conventional catalyst of a mixture of aluminum triisobutyl and titanium tetrachloride to polymerize isoprene, a mol ratio of aluminum to titanium (Al/Ti) of about 1/1 is used when it is desired to form cis 1,4 polyisoprene. Likewise, in using a mixture of aluminum triisobutyl and titanium tetraiodide to polymerize butadiene a mol ratio of Al/Ti of about 1/1 to about 10/1 is used when it is desired to form cis 1,4 polybutadiene. The effect of these mol ratios are well known to the art to which this invention pertains and therefore will not be discussed at great length here.

In addition to the organo-metallic catalyst systems specifically mentioned above other organo-metallic catalyst systems useful to polymerize conjugated diolefins are known to the art. This invention also applies to polydienes prepared by these organo-metallic systems. It should be understood that the specific catalyst system employed, the specific mol ratios of the components of the catalyst systems, the specific amounts of catalyst employed and the specific polymerization techniques are not important to the practice of this invention. So long as the polymers of the conjugated diolefins are prepared by means of organo-metallic catalyst systems they may be increased in molecular weight by the practice of this invention.

As was stated above this invention is concerned with a method of increasing the molecular weight of organo-metallic catalyzed stereospecifically oriented polymers of conjugated dienes, particularly butadiene and isoprene. This is accomplished by adding certain aryl-azo and certain aryl-hydrazo compounds (described in greater detail below) to the polymerization mixtures of these polymers prior to the deactivation of the catalyst or isolation of the polymer. The polymerization mixtures containing the arylazo or arylhydrazo compounds are allowed to react for a period of time to allow the molecular weight to increase. The length of time required to effect this increase in molecular weight depends upon a number of factors such as the temperature, the activity of the catalyst employed to form the polymer, viscosity of the polymerization solution, the activity of the residual catalyst and other factors. For example, if the mixture is very fluid, the temperature around 50° C. and fairly large amounts of arylazo or arylhydrazo compounds employed, satisfactory increases in molecular weight have been obtained in as little as 10 minutes. However, for the sake of uniformity and convenience a time of 1 hour has been found to produce satisfactory results in most cases.

The arylazo compounds useful in the practice of this invention are those arylazo compounds represented by the formula R—N=N—R' wherein R and R' are selected from the group of radicals consisting of phenyl, the halogen substituted phenyls, the lower alkyl substituted phenyls, the lower alkoxy substituted phenyls, the aryl substituted phenyls, the aryloxy substituted phenyls, naphthyl, the halogen substituted naphthyls, the lower alkyl substituted naphthyls, the lower alkoxy substituted naphthyls, the aryl substituted naphthyls and the aryloxy substituted naphthyls. The terms lower alkyl and lower alkoxy are meant to include any alkyl radical or alkoxy radical with from one to four carbon atoms. The term halogen is meant to include chlorine, bromine, iodine fluorine. The terms aryl and aryloxy where used to describe the substituents are meant to include both phenyl and naphthyl radicals. The arylazo compounds may be substituted either in one aryl ring or both aryl rings and may be monosubstituted or polysubstituted by the above mentioned substituents and may be substituted in any possible position. Representative examples of such arylazo compounds are: azobenzene; the chloro azobenzenes; the fluoro azobenzenes; the bromo azobenzenes; the dichloro azobenzenes; the dibromo azobenzenes; the trichloro azobenzenes; the tetrachloro azobenzenes; the azotoluenes; the ethyl azobenzenes; the isopropyl azobenzenes; the dimethyl azobenzenes; the tetramethyl azobenzenes; the methoxy azobenzenes; the ethoxy azobenzenes; the dimethoxy azobenzenes; the diethoxy azobenzenes; the diphenyl azobenzenes; the phenyl azobenzenes; the naphthalene azobenzenes; the azoanisoles; the phenyl azostilbenes; the azophenetoles; the chloro azonaphthalenes; the bromo azonaphthalenes; the dichloro azonaphthalenes; the dibromo azonaphthalenes; the methyl azonaphthalenes; the dimethyl azonaphthalenes; the trimethyl azonaphthalenes; the tetramethyl azonaphthalenes;

the ethyl azonaphthalenes; the methoxy azonaphthalenes; the dimethoxy azonaphthalenes; the ethoxy azonaphthalenes; the phenyl azonaphthalenes; the phenoxy azonaphthalenes; the naphthalene azobenzenes; the methoxy naphthalene azobenzenes; the ethoxy naphthalene azobenzenes; and the methyl naphthalene azobenzenes.

In addition to the arylazo compounds listed above, other materials which yield arylazo compounds, when placed in the environment of this invention, may also be employed in the practice of this invention. For instance, materials such as azoxybenzene, substituted azoxybenzenes, nitrosobenzene and substituted nitrosobenzenes, when reacted with organo-metallics (such as the catalyst system used to prepare the polymers to which this invention relates), form azobenzene or substituted azobenzenes. Thus, such materials are intended to be included within the scope of this invention.

In addition to the arylazo compounds mentioned above, it is also possible to employ cyclic arylazo compounds such as benzocinnoline

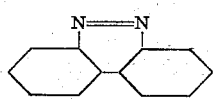

and its substituted derivatives in the practice of this invention.

The arylhydrazo compounds useful in the practice of this invention are those arylhydrazo compounds represented by the formula

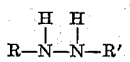

wherein R and R' are selected from the group of radicals consisting of phenyl, the halogen substituted phenyls, the lower alkyl substituted phenyls, the lower alkoxy substituted phenyls, the aryl substituted phenyls, the aryloxy substituted phenyls, naphthyl, the halogen substituted naphthyls, the lower alkyl substituted naphthyls, lower alkoxy substituted naphthyls, aryl substituted naphthyls, and the aryloxy substituted naphthyls. The terms lower alkyl and lower alkoxy are meant to include any alkyl radical or alkoxy radical with from one to four carbon atoms. The term halogen is meant to include chlorine, bromine, iodine and fluorine. The terms aryl and aryloxy where used to describe the substituents are meant to include both phenyl and naphthyl radicals. The aryl hydrazo compounds may be substituted either in one aryl ring or both aryl rings and may be mono-substituted or polysubstituted and may be substituted in any possible position by the above-named substituents. Representative examples of such arylhydrazo compounds are: hydrazo benzene; the chloro hydrazobenzenes; the fluoro hydrazobenzenes; the bromo hydrazobenzenes; the dichloro hydrazobenzenes; the dibromo hydrazobenzenes; the trichloro hydrazobenzenes; the tetrachloro hydrazobenzenes; the hydrazo toluenes; the ethyl hydrazobenzenes; the isopropyl hydrazobenzenes; the dimethyl hydrazobenzenes; the tetramethyl hydrazobenzenes; the methoxy hydrazobenzenes; the ethoxy hydrazobenzenes; the dimethoxy hydrazobenzenes; the diethoxy hydrazobenzenes; the diphenyl hydrazobenzenes; the phenyl hydrazobenzenes; the naphthalene hydrazobenzenes; the hydrazoanisoles; the phenyl hydrazostilbenes; the hydrazophenetoles; the chloro hydrazonaphthalenes; the bromo hydrazonaphthalenes; the dibromo hydrazonaphthalenes; the methyl hydrazonaphthalenes; the dimethyl hydrazonaphthalenes; the trimethyl hydrazonaphthalenes; the tetramethyl hydrazonaphthalenes; the ethyl hydrazonaphthalenes; the methoxy hydrazonaphthalenes; the dimethoxy hydrazonaphthalenes; the ethoxy hydrazonaphthalenes; the phenyl hydrazonaphthalenes; the phenoxy hydrazonaphthalenes; the naphthalene hydrazonaphthalenes; the methoxy naphthalene hydrazonaphthalenes; the ethoxy naphthalene hydrazonaphthalenes and the methyl naphthalene hydrazonaphthalenes.

In addition to the aryl hydrazo compounds listed above, it is possible to employ materials such as N,N' diaryl N,N' dialkyl hydrazo compounds or N,N' diaryl N alkyl hydrazo compounds, wherein the hydrogens of the hydrazo groups are partially or completely replaced by lower alkyl radicals such as methyl, ethyl, propyl, isopropyl and the primary, secondary, and tertiary butyl radicals. Representative examples of such materials are N,N' diethyl hydrazobenzene (N,N' diphenyl N,N' diethyl hydrazine), N,N' dimethyl hydrazonaphthalene (N,N' dinaphthyl N,N' dimethyl hydrazine), N methyl hydrazobenzene (N,N' diphenyl N methyl hydrazine) and the like.

The amount of aryl-azo and aryl-hydrazo compounds required to increase the molecular weight of organo-metallic catalyzed polymers of conjugated dienes has been found to vary from 0.2 to 3.0 parts by weight of aryl-azo and aryl-hydrazo compound per 100 parts by weight of monomers employed. Of course, the exact amount of these compounds will depend on a number of factors, for instance, the increase in molecular weight required, the temperature at which the polymerization solution is kept in contact with these compounds, the time which these compounds are kept in contact with the organo-metallic catalyzed polymers as well as the viscosity of the polymeric solution. However, it has been found that satisfactory improvements in molecular weight can usually be effected by varying the amounts from about 0.4 to 2.0 parts of aryl-azo and aryl-hydrazo compounds per 100 parts of monomers employed in the polymerization. (For the purpose of defining an improvement in molecular weight, an increase of 0.5 in dilute solution viscosity is considered significant.)

While the exact mechanism or reason for the increase in molecular weight of such polymers by means of aryl-azo and aryl-hydrazo compounds is not known, it is believed that in some manner, not fully understood, there is a coupling of at least some of the polymer chains to form longer polymer chains thus increasing the average molecular weight of the polymer.

The practice of this invention is further illustrated by the following examples which are illustrative rather than limitative of the scope of this invention.

In these examples the polymers of isoprene and butadiene were prepared by means of organo-metallic catalyst systems. The polymerization mixtures were then treated with the aryl-azo or aryl-hydrazo compounds according to the invention and the molecular weight allowed to increase. The polymerization mixtures were then coagulated with alcohol/water mixtures to isolate the polymers and deactivate the catalyst and the polymers washed and dried. Certain physical properties were obtained on both polymers treated according to the invention and control or untreated polymers. The specific treatments are indicated in each example. The physical properties obtained on the polymers are reported in tables.

In these examples and tables all parts are by weight unless otherwise noted. The amounts of catalyst empolyed are expressed in parts per 100 parts of monomers employed (p.h.m.). The amounts of aryl-azo or aryl-hydrazo compounds employed are expressed in parts per 100 parts of monomers employed (p.h.m.). In some examples this is also expressed in millimols. Yield, where reported, is expressed in percent of monomer converted to solid elastomeric polymer. The dilute solution viscosity (D.S.V.) measurement was obtained by measuring the viscosity of a 1% by weight solution of the polymer in benzene and is an indication of the molecular weight of the polymers. The relationship of the number average molecular weight to viscosity of polymers of this type is discussed and explained in an article by Gregg and Mayo in "The Journal of American Chemical Society," Vol. 70, p. 2375 (1948). The structural analysis of the polymers, where reported, was determined by well known infrared techniques and is reported in terms of percent cis 1,4 addition. The osmotic average molecular weight, where reported, was determined by conventional techniques for determining the molecular weight of high polymers using a Sands-Johnson type osmometer.

EXAMPLE 1

To each of three clean, dry, four-ounce, screw cap bottles equipped with self-sealing gaskets was added 75 cubic centimeters of a 20% by volume solution of monomeric isoprene in heptane as a solvent or diluent. This corresponds to 10 grams of isoprene and a solvent/monomer volume ratio of 4/1. These solutions were nitrogen flushed, sealed and the bottles chilled to about 10° C. To each of these bottles were added, by means of an hypodermic syringe, 1.17 p.h.m. aluminum triisobutyl dissolved in heptane. To each bottle was also added 0.95 p.h.m. of titanium tetrachloride dissolved in heptane. These bottles were then placed in a 10° C. rotating bath and allowed to react for a period of 18 hours. The bottles were removed from the bath and treated in the following manner:

Bottle 1—10 cubic centimeters of heptane added (control)
Bottle 2—0.54 p.h.m. of azobenzene in 10 cubic centimeters of heptane added (0.33 millimol)
Bottle 3—1.20 p.h.m. of azobenzene in 10 cubic centimeters of heptane added (0.66 millimol)

The thus treated bottles were returned to a 50° C. rotating bath and allowed to react for one hour at which time the contents were precipitated into an isopropanol antioxidant solution to deactivate the catalyst and precipitate the polymer. The polymer was separated from the isopropanol and washed with isopropanol and dried at room temperature in a vacuum oven. The properties obtained on th rubbery polymers are recorded below:

*Table 1*

| Bottle | Treatment | Dilute solution viscosity | Osmotic Average molecular weight | Percent Cis 1,4 structure | Percent Yield |
|---|---|---|---|---|---|
| 1 | Heptane only—control. | 2.5 | 120,000 | 79 | 75 |
| 2 | 0.54 part azobenzene per 100 parts monomer. | 4.3 | 207,000 | 89 | 69 |
| 3 | 1.2 parts azobenzene per 100 parts monomer. | 4.2 | ---------- | 84 | 75.5 |

EXAMPLE 2

Four bottles were prepared in a manner described in Example 1 except that they were reacted 17 hours at 10° C. and removed from the bath and treated in the following manner:

Bottle 1 was precipitated into an isopropanol antioxidant solution to deactivate the catalyst and precipitate the polymer
Bottle 2—0.54 p.h.m. of azobenzene in 3 cubic centimeters of benzene was added (0.33 millimol)
Bottle 3—1.5 p.h.m. of azobenzene in 9 cubic centimeters of benzenes was added (1.0 millimol)
Bottle 4—5 cubic centimeters of benzene only were added (control)

Bottles 2, 3 and 4 were returned to the bath and reacted 4 additional hours at 10° C. at which time these three bottles were precipitated in an isopropanol antioxidant solution to deactivate the catalyst and precipitate the polymer. Polymers were dried in a vacuum oven at about 30° C. The properties obtained on the rubbery polymers are recorded below:

*Table 2*

| Bottle | Treatment | Dilute solution viscosity | Percent Yield |
|---|---|---|---|
| 1 | No benzene—control | 3.1 | 36 |
| 2 | Azobenzene 0.54 part per 100 parts monomer. | 4.95 | 34 |
| 3 | Azobenzene 1.8 parts per 100 parts monomer. | 5.55 | 50 |
| 4 | 5 cubic centimeters benzene only—control. | 2.65 | 60.5 |

EXAMPLE 3

A similar procedure to that of Example 1 was followed except 5 bottles were prepared, 0.555 p.h.m. of aluminum triisobutyl and 0.475 p.h.m. of titanium tetrachloride were employed as the catalyst, and a temperature of 50° C. was employed in the polymerizations. At the end of 4 hours the bottles were removed from the bath, treated in the following manner:

Bottle 1 was precipitated into an isopropanol/antioxidant solution to destroy the catalyst and precipitate the polymer
Bottle 2—0.54 p.h.m. azobenzene in 3 cubic centimeters of benzene were added
Bottle 3—1.08 p.h.m. azobenzene in 6 cubic centimeters of benzene were added
Bottle 4—1.6 p.h.m. azobenzene in 9 cubic centimeters of benzene were added
Bottle 5—5 cubic centimeters of benzene only were added (control)

Bottles 2, 3, 4 and 5 were returned to the 50° C. bath and reacted for an additional time of 1 hour. At the end of this time these bottles were precipitated into an isopropanol antioxidant solution to deactivate the catalyst and precipitate the polymer. Polymers were dried in a vacuum oven at about 30° C. Physical properties obtained on these polymers are recorded below:

*Table 3*

| Bottle | Treatment | Dilute Solution Viscosity | Percent Yield |
|---|---|---|---|
| 1 | Control—No benzene | 2.31 | 49 |
| 2 | 0.54 part azobenzene per 100 parts isoprene. | 2.84 | 48 |
| 3 | 1.08 parts azobenzene per 100 parts isoprene. | 2.88 | 46 |
| 4 | 1.6 parts azobenzene per 100 parts isoprene. | 3.21 | 55.5 |
| 5 | 5 cubic centimeters benzene only—control. | 2.31 | 57.7 |

EXAMPLE 4

Five bottles were prepared in a manner described in Example 1. After being allowed to react for a period of 18 hours at a temperature of 10° C., the bottles were removed from the polymerization bath and treated in the following manner:

Bottle 1—received no treatment and is considered to be the control
Bottle 2—0.4 p.h.m. of azobenzene added in 10 cubic centimenters of heptane
Bottle 3—0.8 p.h.m. of azobenzene added in 10 cubic centimenters of heptane
Bottle 4—1.6 p.h.m. of azobenzene added in 10 cubic centimenters of heptane
Bottle 5—10 cubic centimeters of heptane only added The thus treated bottles were returned to a 5° C. rotating bath and allowed to remain for a period of one hour at which time the contents of each bottle were precipitated into an isopropanol/water/antioxidant solution to deactivate the catalyst and precipitate the polymer. The polymer was separated from the isopropanol, washed with isopropanol, dried at room temperature in a vacuum oven. The properties obtained on the rubbery polymers are recorded below:

*Table 4*

| Bottle | Treatment | Dilute Solution Viscosity | Percent Yield |
|---|---|---|---|
| 1 | None | 3.16 | 36 |
| 2 | 0.4 p.h.m. azobenzene | 4.45 | 49 |
| 3 | 0.8 p.h.m. azobenzene | 5.3 | 50 |
| 4 | 1.6 p.h.m. azobenzene | 4.7 | 48 |
| 5 | Heptane only | 3.14 | 45 |

EXAMPLE 5

Five bottles were prepared in a manner described in Example 1 except that 0.555 p.h.m. of aluminum triisobutyl and 0.475 p.h.m. of titanium tetrachloride were employed as the catalyst and a reaction temperature of 50° C. and a reaction time of 4 hours were used. At the end of this time the five bottles were removed from the bath and treated in the following manner:

Bottle 1—received no treatment and is considered to be the control

Bottle 2—0.2 p.h.m. of azobenzene in 10 cubic centimeters heptane added

Bottle 3—0.4 p.h.m. of azobenzene in 10 cubic centimeters heptane added

Bottle 4—0.8 p.h.m. of azobenzene in 10 cubic centimeters heptane added

Bottle 5—10 cubic centimeters of heptane only added—control

The thus treated bottles were returned to a 50° C. bath and allowed to react for an additional time of one hour at which time the contents were precipitated into an isopropanol/antioxidant solution to deactivate the catalyst and precipitate the polymer. The polymer was separated from the isopropanol solution, washed and dried at room temperature in a vacuum oven. The properties obtained on the rubbery polymers are recorded below in Table 5.

*Table 5*

| Bottle | Treatment | Dilute Solution Viscosity | Percent Yield |
|---|---|---|---|
| 1 | None | 2.14 | 65 |
| 2 | 0.2 p.h.m. Azobenzene | 2.88 | 71 |
| 3 | 0.4 p.h.m. Azobenzene | 3.76 | 58 |
| 4 | 0.8 p.h.m. Azobenzene | 3.05 | 65 |
| 5 | 10 cc. heptane only | 2.6 | 60 |

EXAMPLE 6

Nine bottles were prepared by placing 75 cubic centimeters of a 20% by volume solution of isoprene in heptane in clean 4-ounce screw capped bottles. This corresponds to 10 grams of isoprene and a solvent monomer volume ratio of 4/1. Each of these bottles was flushed with nitrogen, capped and chilled to 50° C. To each bottle was added 1.1 parts by weight of aluminum triisobutyl/100 parts isoprene (0.6 millimol) and 0.9 part by weight of titanium tetrachloride/100 parts isoprene as solutions in heptane. These bottles were placed in a 5° rotating bath and allowed to react for 18½ hours. At the end of this time the bottles were removed from this bath and treated in the following manner.

Bottle 1—received no treatment and is considered to be the control

Bottle 2—0.54 part p.h.m. azobenzene in 10 milliliters of benzene added

Bottle 3—1.2 p.h.m. azobenzene in 10 milliliters benzene added

Bottle 4—1.6 p.h.m. azobenzene in 10 milliliters benzene added

Bottle 5—2.1 p.h.m. azobenzene in 10 milliliters benzene added

Bottle 6—2.6 p.h.m. azobenzene in 10 milliliters benzene added

Bottle 7—5.4 p.h.m. azobenzene in 10 milliliters benzene added

Bottle 8—12.0 p.h.m. azobenzene in 10 milliliters benzene added

Bottle 9—10 milliliters benzene only added

The thus treated bottles were returned to a 50° C. rotating bath and allowed to remain for a period of ½ hour at the end of which time the contents of each bottle were precipitated into an alcohol/antioxidant solution to deactivate the catalyst and precipitate the polymer. The polymer was separated from the alcohol solution washed and dried at room temperature in a vacuum oven. The properties of the polymer are recorded in Table 6 below:

*Table 6*

| Bottle | Treatment | Dilute Solution Viscosity | Percent Yield |
|---|---|---|---|
| 1 | None—control | 2.92 | 68 |
| 2 | 0.54 p.h.m. azobenzene [1] | 4.25 | 80 |
| 3 | 1.2 p.h.m. azobenzene [1] | 5.35 | 80 |
| 4 | 1.6 p.h.m. azobenzene [1] | 4.7 | 78 |
| 5 | 2.1 p.h.m. azobenzene [1] | 5.5 | 84 |
| 6 | 2.6 p.h.m. azobenzene [1] | 5.6 | 79 |
| 7 | 5.4 p.h.m. azobenzene [1] | 5.45 | 80 |
| 8 | 12.0 p.h.m. azobenzene [1] | 5.48 | 64 |
| 9 | 10 cubic centimeters benzene only—control. | .24 | 83 |

[1] The azobenzene added in 10 cubic centimeters of benzene.

EXAMPLE 7

Five bottles were prepared in a manner according to Example 6 except that butadiene was employed as the monomer instead of isoprene and a temperature of 30° C. was employed instead of 5° C. The bottles were allowed to polymerize for 18 hours, removed from the rotating bath and treated in the following manner:

Bottle 1—received no treatment and is considered to be the control

Bottle 2—0.5 part azobenzene in 10 milliliters benzene added

Bottle 3—1.0 p.h.m. azobenzene in 10 milliliters benzene added

Bottle 4—1.5 p.h.m. azobenzene in 10 milliliters benzene added

Bottle 5—10 milliliters benzene only added—control

After these additions had been made the bottles were returned to a 50° C. bath and allowed to remain for an additional one hour. The contents were precipitated into an isopropanol/antioxidant solution to deactivate the catalyst and precipitate the polymer. The elastomeric polymer obtained was washed and dried in a vacuum oven at room temperature. The properties obtained on these polymers are recorded in Table 7 below:

*Table 7*

| Bottle | Treatment | Dilute Solution Viscosity | Percent Cis 1,4 Structure | Percent Yield |
|---|---|---|---|---|
| 1 | None—Control | 2.5 | 69 | 59 |
| 2 | 0.5 p.h.m. azobenzene | 3.6 | 63 | 59 |
| 3 | 1.0 p.h.m. azobenzene | 3.8 | 70 | 60 |
| 4 | 1.5 p.h.m. azobenzene | 3.8 | 67 | 53 |
| 5 | 10 milliliters benzene only—control. | 2.5 | 64 | 55 |

Thus, the above examples illustrate that the practice of this invention causes a substantial increase in the molecular weight of organo-metallic catalyzed polymers of diolefins. This is particularly well illustrated in Example 1 where the osmotic average molecular weight and the dilute solution viscosity value were increased over 70% by the addition of 0.54 p.h.m. azobenzene to an aluminum triisobutyl-titanium tetrachloride catalyzed polyisoprene. It should be understood that similar results may be obtained using other organometallic catalyst systems; other reaction conditions such as other temperatures, solvents, solvent/monomer ratios, times; other amounts of reactants and catalyst; other aryl-azo compounds; other aryl-hydrazo and other amounts of aryl-azo and aryl-hydrazo compounds so long as the general procedures outlined above are followed. The choice of each of these factors, of course, is within the skill of those skilled in the art to which this invention pertains.

While certain representative embodiments and details have been shown for the purpose of illustrating the invention, it will be apparent to those skilled in this art that various changes and modifications may be made therein without departing from the spirit or scope of the invention.

I claim:

1. In the process of polymerizing conjugated 1,3-diolefins by means of organo-metallic catalysts to form stereospecific spatially oriented polymers the improvement comprising adding to the polymerization mixture, prior to catalyst deactivation, a compound selected from the group consisting of aryl-azo compounds of the formula R—N=N—R' wherein R and R' are selected from the group of radicals consisting of phenyl, the halogen substituted phenyls, the lower alkyl substituted phenyls, the lower alkoxy substituted phenyls, the aryl substituted phenyls, the aryloxy substituted phenyls, naphthyl, the halogen substituted naphthyls, the lower alkyl substituted naphthyls, the lower alkoxy substituted naphthyls, the aryl substituted naphthyls and the aryloxy substituted naphthyls, allowing the molecular weight of the polymers to increase and isolating the polymers from the reaction mixture.

2. In the process of polymerizing conjugated 1,3 diolefins by means of organo-metallic catalyst to form cis 1,4 polymer structures the improvement comprising adding to the polymerization mixture, prior to catalyst deactivation, a compound selected from the group consisting of aryl-azo compounds of the formula R—N=N—R' wherein R and R' are selected from the group of radicals consisting of phenyl, the halogen substituted phenyls, the lower alkyl substituted phenyls, the lower alkoxy substituted phenyls, the aryl substituted phenyls, the aryloxy substituted phenyls, naphthyl, the halogen substituted naphthyls, the lower alkyl substituted naphthyls, the lower alkoxy substituted naphthyls, the aryl substituted naphthyls and the aryloxy substituted naphthyls, allowing the molecular weight of the polymers to increase and isolating the polymers from the reaction mixture.

3. In the process of polymerizing conjugated 1,3 diolefins by means of organo-metallic catalyst to form trans 1,4 polymer structures the improvement comprising adding to the polymerization mixture, prior to catalyst deactivation, a compound selected from the group consisting of aryl-azo compounds of the formula R—N=N—R' wherein R and R' are selected from the group of radicals consisting of phenyl, the halogen substituted phenyls, the lower alkyl substituted phenyls, the lower alkoxy substituted phenyls, the aryl substituted phenyls, the aryloxy substituted phenyls, naphthyl, the halogen substituted naphthyls, the lower alkyl substituted naphthyls, the lower alkoxy substituted naphthyls, the aryl substituted naphthyls and the aryloxy substituted naphthyls, allowing the molecular weight of the polymers to increase and isolating the polymers from the reaction mixture.

4. In the process according to claim 1 wherein the conjugated 1,3 diolefin is selected from the group consisting of isoprene and butadiene.

5. In the process according to claim 4 wherein the added compound is an aryl-azo compound.

6. In the process according to claim 5 wherein the aryl-azo compound is azo-benzene.

7. In the process according to claim 2 wherein the conjugated 1,3 diolefin is selected from the group consisting of isoprene and butadiene.

8. In the process according to claim 7 wherein the added compound is an aryl-azo compound.

9. In the process according to claim 8 wherein the arylazo compound is azobenzene.

10. In the process of preparing cis-1,4 polyisoprene by polymerizing isoprene in the presence of a catalyst which is a mixture of an aluminum alkyl and titanium tetrachloride the improvement comprising adding to the polymerization mixture, prior to catalyst deactivation, about from 0.2 to 3.0 parts by weight of azobenzene per 100 parts of isoprene, allowing the molecular weight of the cis 1,4-polyisoprene to increase and isolating the cis-1,4 polyisoprene from the reaction mixture.

References Cited in the file of this patent

UNITED STATES PATENTS

| 2,520,338 | Robertson | Aug. 29, 1950 |
| 2,761,857 | Barnhart | Sept. 4, 1956 |

FOREIGN PATENTS

| 543,292 | Belgium | June 2, 1956 |